(12) United States Patent
Stewart et al.

(10) Patent No.: US 10,173,784 B2
(45) Date of Patent: Jan. 8, 2019

(54) MOBILE MULTI-MODE POWER GENERATION SYSTEM WITH MODE BASED ADJUSTABLE DRAG CONFIGURATION

(71) Applicant: The United States of America as represented by the Secretary of the Navy, Washington, DC (US)

(72) Inventors: James Stewart, Bloomington, IN (US); Lyndon P. McCoy, Bedford, IN (US); Gerald Miller, Bedford, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 402 days.

(21) Appl. No.: 15/132,300

(22) Filed: Apr. 19, 2016

(65) Prior Publication Data

US 2017/0184022 A1    Jun. 29, 2017

Related U.S. Application Data

(60) Provisional application No. 62/271,439, filed on Dec. 28, 2015.

(51) Int. Cl.
*B64D 41/00* (2006.01)
*F02C 7/042* (2006.01)
(Continued)

(52) U.S. Cl.
CPC ........... *B64D 41/007* (2013.01); *B64D 27/12* (2013.01); *B64D 41/00* (2013.01); *F02C 7/042* (2013.01); *F02C 7/36* (2013.01); *F02K 7/10* (2013.01); *F02K 7/16* (2013.01); *B64D 2041/002* (2013.01); *B64D 2221/00* (2013.01); *F05D 2220/34* (2013.01); *F05D 2220/50* (2013.01);
(Continued)

(58) Field of Classification Search
CPC ............ B64D 41/007; B64D 2041/002; H02K 7/1823; F05B 2220/706; F05B 2220/31; F02C 7/36; F02C 7/32
See application file for complete search history.

(56) References Cited

U.S. PATENT DOCUMENTS

| 6,127,758 A * | 10/2000 | Murry ................. | B64D 41/007 244/53 R |
| 8,424,800 B2 * | 4/2013 | Finney ................. | B64D 41/007 244/53 R |
| 2011/0033280 A1 * | 2/2011 | Justak .................. | B64D 41/007 415/73 |

OTHER PUBLICATIONS

Raptor, Bomb Release Units, F-15E.info, printed Mar. 25, 2016 at http://www.f-15e.info/joomla/weapons/weapons-stores/120-bomb-release-units, 3 pages.
(Continued)

*Primary Examiner* — Gerald L Sung
*Assistant Examiner* — Christopher M Adams
(74) *Attorney, Agent, or Firm* — Christopher A. Monsey

(57) ABSTRACT

Various embodiments of the invention can include a portable power system with multiple power generation modes and mode based adjustable drag configuration. Embodiments of the invention include a system with an adjustable inlet ram air inlet, a ram air powered section (e.g. a ram air powered turbine with an adjustable ram air inlet), a fuel powered section, e.g., jet fuel powered auxiliary power unit, which is used when insufficient ram air is present or a power surge requires augmented power generation, and a generator section selectively coupled with the ram air powered section and the fuel powered section.

17 Claims, 6 Drawing Sheets

(51) Int. Cl.
*F02C 7/36* (2006.01)
*B64D 27/12* (2006.01)
*F02K 7/10* (2006.01)
*F02K 7/16* (2006.01)

(52) U.S. Cl.
CPC ......... *F05D 2220/76* (2013.01); *Y02T 50/672* (2013.01)

(56) References Cited

OTHER PUBLICATIONS

Parts Hangar, Integrated Publishing, Inc., printed Mar. 25, 2016 at http://navyaviation.tpub.com/14313/css/14313_232.htm, 2 pages.
BU-209: How does a Supercapacitor Work?, Battery University, printed Mar. 25, 2016 at http://batteryuniversity.com/learn/article/whats_the_role_of_the_supercapacitor, 20 pgs.

\* cited by examiner

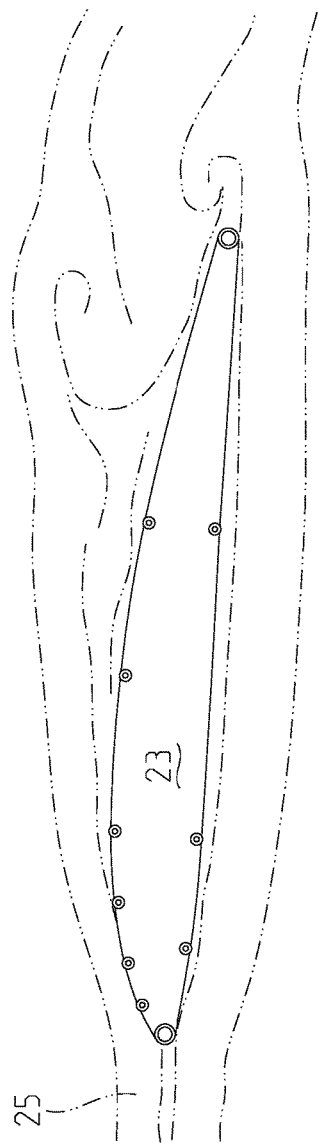
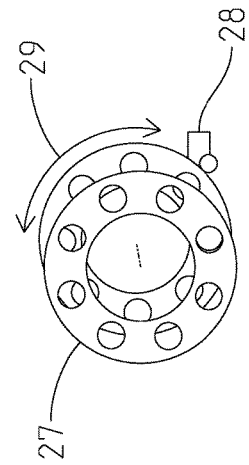
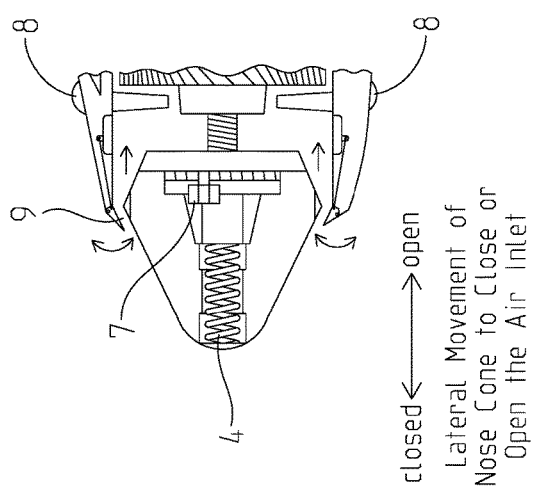
Fig. 2A
Fig. 2C
Fig. 2B

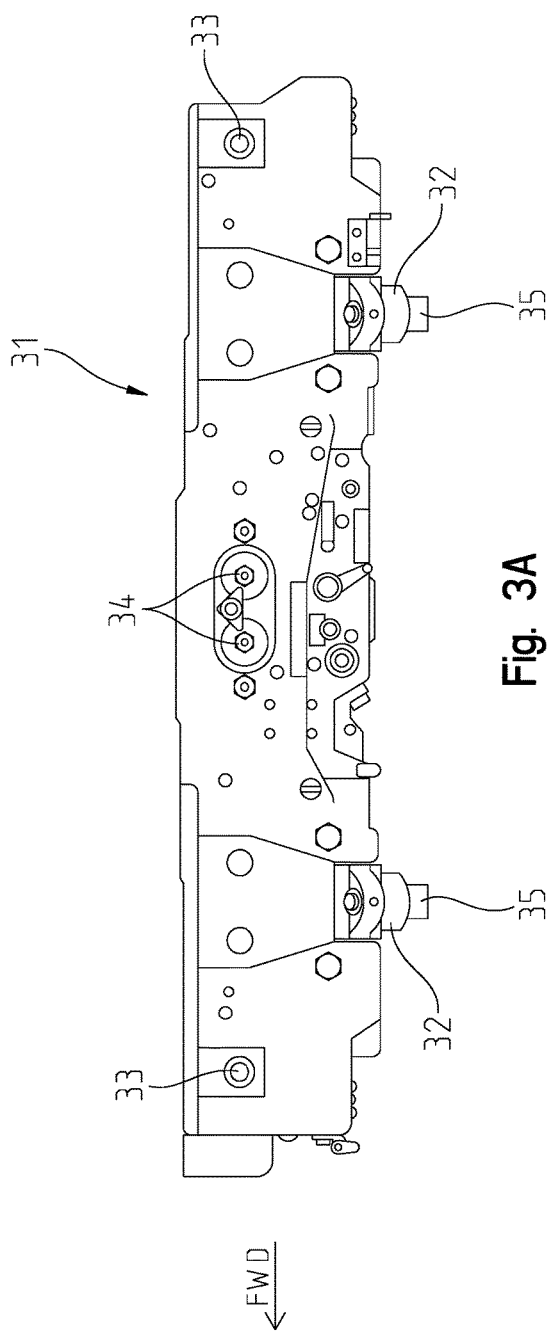
Fig. 3A
Fig. 3B
Fig. 3C

MOBILE MULTI-MODE POWER GENERATION SYSTEM WITH MODE BASED ADJUSTABLE DRAG CONFIGURATION

CROSS-REFERENCE TO RELATED APPLICATIONS

The present application claims priority to U.S. Provisional Patent Application Ser. No. 62/271,439, filed on Dec. 28, 2015, entitled "Mobile Multi-Mode Power Generation System with Mode Based Adjustable Drag Configuration," the disclosure of which is expressly incorporated by reference here.

STATEMENT REGARDING FEDERALY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,328) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

Various embodiments of the invention are directed to a portable power system with multiple power generation modes and mode based adjustable drag configuration. In particular, embodiments of the invention include a system with an adjustable inlet ram air inlet, a ram air powered section (e.g. a ram air powered turbine with an adjustable ram air inlet), a fuel powered section, e.g., jet fuel powered auxiliary power unit, which is used when insufficient ram air is present or a power surge requires augmented power generation, and a generator section selectively coupled with the ram air powered section and the fuel powered section.

A need exists to provide a mobile auxiliary power unit that can be selectively attached to mobile structures to provide on-demand power to another structure such as an aircraft. Systems or mobile structures can require additional power above and beyond what existing power generation systems can provide. Examples of a system that might require additional power are laser systems or other high power demand systems. Applications that can require such systems can include search and rescue, mobile mining systems, underwater systems, manufacturing systems, demolition systems, military systems, radio frequency systems, directed energy systems, firefighting systems, space systems, airborne systems, or land mobile systems as well as fixed structures.

One powered mode can include a system that uses a jet engine and integral fuel tank within an auxiliary power pod that hangs from an aircraft wing or hard point. Multiple drag adjustment systems can be used with various embodiments of the invention. For example, a ram air powered system can use an air path that enters through a variable inlet structure which adjusts its aperture(s) based on power demand/production needs via a wind turbine section that drives a power train which in turn drives a power generation section. As power demand declines, then the variable inlets close and thereby reduce drag and power production. The variable inlet section also closes, adjusts, or reduces its aperture size until sufficient ram airflow is present to begin powering the wind turbine section or the auxiliary power unit is activated and requires airflow through the pod or structure to operate. The auxiliary power unit is also connected to the power generation section through another power train section which then turns the generator section and thereby generates power when insufficient ram airflow occurs or a surge power requirement exists. In some embodiments, the pod is releasably attached to an exterior section of a mobile structure such as an aircraft pylon. A transmission or clutch section or system can be used to decouple the wind turbine and the auxiliary power unit to reduce or adjust drag or power required to turn the power generator section. Exterior sections of various embodiments can be formed to reduce external drag.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 2A, 2B, and 2C show an exemplary wing structure with airflow and an exemplary airflow used with variable inlet vane;

FIGS. 3A, 3B, and 3C show multiple views of an exemplary external mounting structure that an exemplary mobile multi-mode power generation system with mode based adjustable drag configuration is mounted to;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1A:
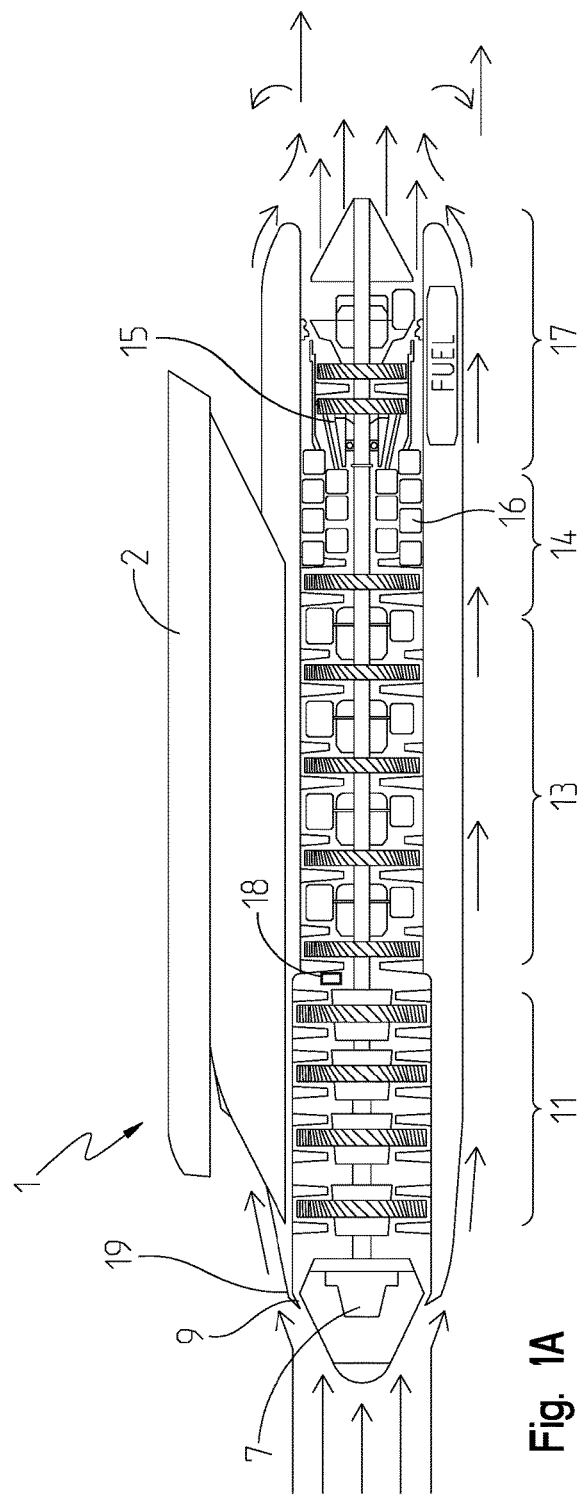
FIGS. 1A and 1B show a simplified cut-away view of one embodiment of a mobile multi- mode power generation system with mode based adjustable drag configuration.
Figure 1B:
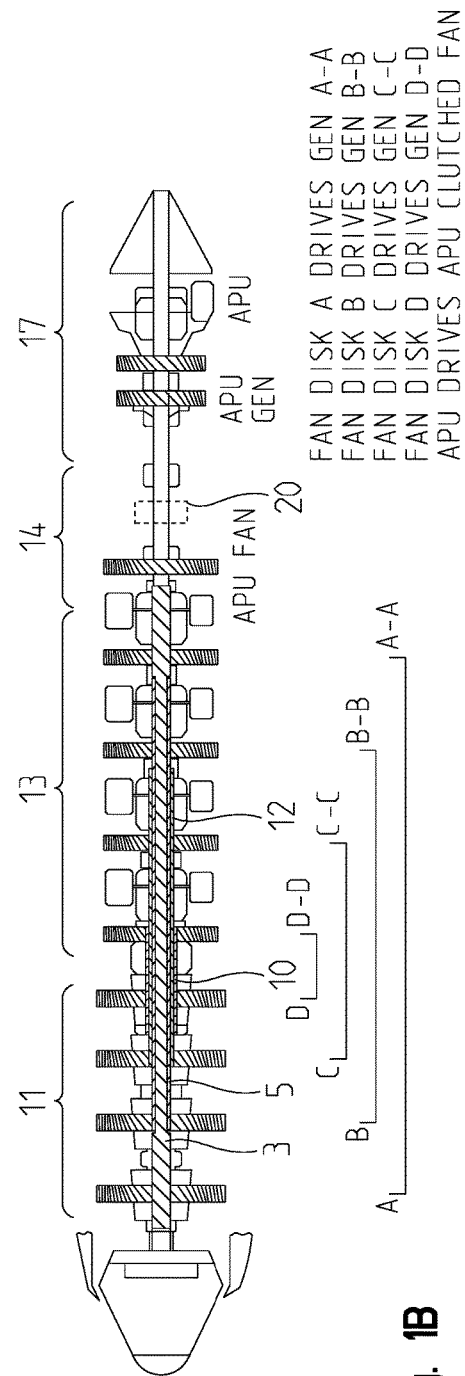

FIGS. 1A and 1B show a simplified cut-away view of a power generation structure 1 including one embodiment of a mobile multi-mode power generation system with mode based adjustable drag configuration. Embodiments of the invention can include a variable nose cone actuator 7 and inlet opening 9 that provides reduced airflow to limit drag during low speed flight as during takeoff and landings. A ram air turbine section 11 is coupled with and drives a power transfer or transmission system, e.g., including a split or nested shafts 3, 5, 10, and 12, as well as a coupler/decoupler or transmission 20. These exemplary multiple split or nested shafts 3, 5, 10, 12 each have a different length with an outer shaft 10, a shaft 12 that is nested and rotates within the outer shaft 10, another shaft 5 that is nested and rotates within shaft 12, and another shaft 3 that rotates and is nested within shaft 5 that are each respectively coupled with and drive a set of generators AA, BB, CC, and DD in a power generator section 13. Some power is directed to power consumption section(s) (not shown), e.g., lasers, and some is directed into a power storage 14 built into the power generation structure 1, e.g., mobile multi-mode power generation system. Some embodiments can include storage sections where power is stored in a capacitor/battery section 16. Capacitors aligned in rows to allow airflow for sufficient intake to reach APU combustion section 15. One embodiment comprises each end of the capacitor/battery section 16 to be coated with a protective coat like armor plating to prevent turbine disintegration. A cowling structure 19 having an internal aperture with a diameter and shape that is formed to overlap with said peripheral edges of the ram air guide structure.

Embodiments of the invention can be configured to provide power only on "wing" power. In these embodiments, an exemplary design embodiment focuses on generating power only thus becoming a more efficient design. Current designs are not efficient enough and capable of producing enough power to suit a needed variety of power needs balanced against other design constraints.

In some embodiments, ram air flow can be ducted through a ram air turbine disks section 11. Some embodiments are not powered as with traditional jet engines. For example, one design utilizes a back-up auxiliary generator 15 for a supplemental supply of power as with and during low speed flight when airflow is not sufficient to provide power. This exemplary system can include embodiments that combine electrical generation, power storage 14, power surge capability, and utilize various components to provide power generation capabilities that are not currently found in existing wind turbine energy production.

Embodiments of the invention can include a variable nose cone inlet and actuator 7. This exemplary variable designed inlet limits airflow through the power generation structure 1. By limiting the airflow internally, an associated Cd-coefficient drag is significantly reduced during non-power generation flight times. In some embodiments, this limited airflow energy can be utilized to produce power where it would normally be lost.

The power generation structure 1 can be designed with improved aerodynamic design that is symbiotic with improved power output. With the elimination of systems that don't produce power, (non-power generation components), the power generation structure 1 can be more efficient at what it does best, i.e., produce power. In one exemplary embodiment, the power generation structure 1 can be used with an airfoil used with variable inlet vain controlled by sensing and measuring variable pressure across the front opening of the power generation structure 1 to open or close vanes for improved airflow as scheduled by computer logic controls. The airfoil can be designed to improve wind flow in a controlled direction. A design aspect of various embodiments includes a goal of producing power while reducing coefficient of drag. Exemplary power generation structures 1 can utilize a reduced vibration design and improved power generation capability or structure while providing the resultant air flow in a desired direction for improved aerodynamics.

In various embodiments, increased power output, improved airflow, and reduced "Cd" can be a byproduct/end result various embodiments. For example, some embodiments can incorporate specifically designed vortex fins, "eddy pressure turbulent zone" pockets, tapered liner "pressure zones", active clearance control applications, and/or structures that result in improved or combined external/internal aerodynamic smoothness. Adding reduced and delayed laminar flow air separation as a part of various embodiments of the power generation structure 1 can increase power output while directly reducing "Cd" in proportion to overall aircraft performance. Exemplary shaped vortex fins can be placed in critical "laminar flow" areas that can reduce "Cd" and improve power output performance. Restricting air flow to specific desired directions as with any airfoil design combined with resultant delays in airflow surface separation offers increased pressures of direct airflow power force to turbine vanes and centrifugal generation components. Exemplary power generation structures 1 can incorporate addition of laminar flow "vanes" the resultant Cd's will be improved in the desired areas and reduced in others.

Embodiments of exemplary power generation structure(s) 1 utilizes reduced wind resistance coefficient of drag, utilizes improved and vectored aerodynamic performance and captures energy normally lost during a normal conventional flight all designed to produce electrical power.

The exemplary variable position nose cone 7 controls and/or limits airflow into ram air turbine section 11 of the power generation structure 1. Some embodiments can have a compressor section capability designed into the turbine section 11 where the auxiliary power unit (APU) 15 requires increased airflow. The exemplary APU 15 can be used for auxiliary power for bit checks and receives fuel from fuel unit 17. Operation of variable nose cone 7 can also be accomplished when an attached vehicle's power (e.g., aircraft integral power systems such as aircraft generator systems) is not available or a system malfunction(s) is detected. APU 15 augmenting power can generate peak capacity output power for systems such as a lasers and or RF system. Surge power capacity can be provided from in a capacitors section (not shown) mounted in the power generation structure 1. In various embodiments, composite materials can be used to house a structural area where system components are disposed.

In various embodiments the variable nose cone actuator or section 1 can be controlled by smart pressure servo mechanism that controls airflow to the turbine section 11, e.g., four turbine section fan blade disks A, B, C, D corresponding to a first, second, third, and fourth turbine respectively. The fan blades can be designed with a counter rotation design to reduce gyroscopic forces and improving airflow pressures to exact momentum from air molecules impacting the turbine blades. The resulting turbine spin turns the split or nested shafts (e.g., multiple shafts within each other with the innermost shaft coupled with the first turbine blade assembly, second shaft coupled with the second turbine blade assembly, third shaft coupled with the third turbine blade assembly, and fourth or outermost shaft coupled with the fourth turbine blade assembly (from blade assemblies numbered from closest to the variable nose cone actuator 7 or forward to back)) and thereby drives corresponding four power generators (e.g., last generator coupled to the first or innermost shaft, second to last generator coupled to the second shaft, third to last generator coupled to the third shaft, and the first or closest to the turbine section generator coupled with the outermost or fourth shaft) to produce, e.g., twenty two to twenty seven kilowatts (kW) each for a power output of, e.g., eighty kW to one hundred and eight kW. When exemplary power generation structure 1 operation is augmented by APU 15 power mounted in aft section of the power generation structure 1, it will provide for a total of, e.g., one hundred and thirty five kW power output. Airflow can also provide cooling for various elements of exemplary embodiments. Additionally, throughout the internal areas of the power generation structure 1, vortex generators 18, can be disposed along air paths outside of paths of moving components in locations, including internal surface areas and tapered internal sections, configured for increasing pressure at specific points to improve efficiency or work from ram air flow in the turbine section 11 as well as in power generation structure 1 sections.

In various embodiments, the turbine section, 11, and the generator section, 13, are coupled in a manner that the first turbine is paired with the last generator. Subsequently, the second turbine is paired with the third generator, the third turbine is paired with the second generator, and the fourth turbine is paired with the first generator. This direct drive allows for each shaft to spin independently of one another. Each turbine is rotating in an opposite direction of the turbine immediately after it to counteract centrifugal force. Each shaft connecting turbine to its coupled generator is supported on roller bearings.

FIGS. 2A, 2B, and 2C show an exemplary wing structure 23, with airflow 25, including a representation of an airflow boundary layer separation. The turbulent aft area on a wing foil reduces control and efficiency of a wing. This figure shows what happens to an airstream as it passes over any surface. The airflow separation creates turbulent air as it leaves the surface. This effect can be associated with reduced vehicle control, reduced lift, increased wind resistance and turbulence, and vibrations that could result in wing flutter and unstable flight conditions. Note that turbulent areas are sometimes desired over aerodynamic loading surfaces allowing improved airflow in certain directions and delaying airflow separation from a surface until it has fully traveled across a surface. Increased pressure buildup could result and an improved reactionary force results. Embodiments of the invention can utilize these dynamic airflow properties to improve turbine power production and reduce Cd-Coefficient of drag, internally and externally.

Below the exemplary wing structure, a diagram of an exemplary airfoil used with variable inlet vane(s) is shown. Controlled by the nose cone actuator 7 and the nose inlet cone depression spring 4, the inlet opening 9 is adjusted to vary how much airflow enters into the power generation structure 1. Laminar airflow sensors 8 determine airflow and are used in conjunction with computer logic controls to determine optimal opening for inlet opening 9 to allow for airflow into the air turbine section 11. Another alternative or backup exemplary embodiment shown can be provided having a first variable inlet control structure discs with a first plurality of holes 27 fixed (enabling air passage) fixed into position in front of the air turbines in combination with a second variable inlet control structure disk with a second plurality of holes 29 configured to rotate to either allow or cutoff airflow to the air turbine section 11 through alignment of the first and second plurality of holes. The first or second variable inlet vane control structure disks 27, 29 can be rotated or controlled via an airflow disk motor and gear 28 which rotates one of the disks 27, 29.

FIGS. 3A, 3B, and 3C show multiple views of an exemplary external mounting structure 31 that an exemplary a mobile multi-mode power generation system with mode based adjustable drag configuration is mounted to. The exemplary power generation structure 1 can attach to an aircraft mounting structure, e.g., a Bomb Rack unit "BRU".

The BRU is attached to the wing or fuselage at pylon stations at aircraft mounting holes 33 and the power generation structure 1 is attached with rotating hooks 35 and the sway brace 32 securely tightened. The BRU system 31 can then detach the power generation structure 1 via ejection charges 34 that disconnect the power generation system 1 in case of emergency. This drawing shows the current systems available to mount the exemplary power generation structure 1. The BRU can be an existing common mounting system. A specially designed aerodynamic shroud (not shown) can be provided to cover the whole BRU assembly from wing to the exemplary power generation structure 1.

Figure 4:
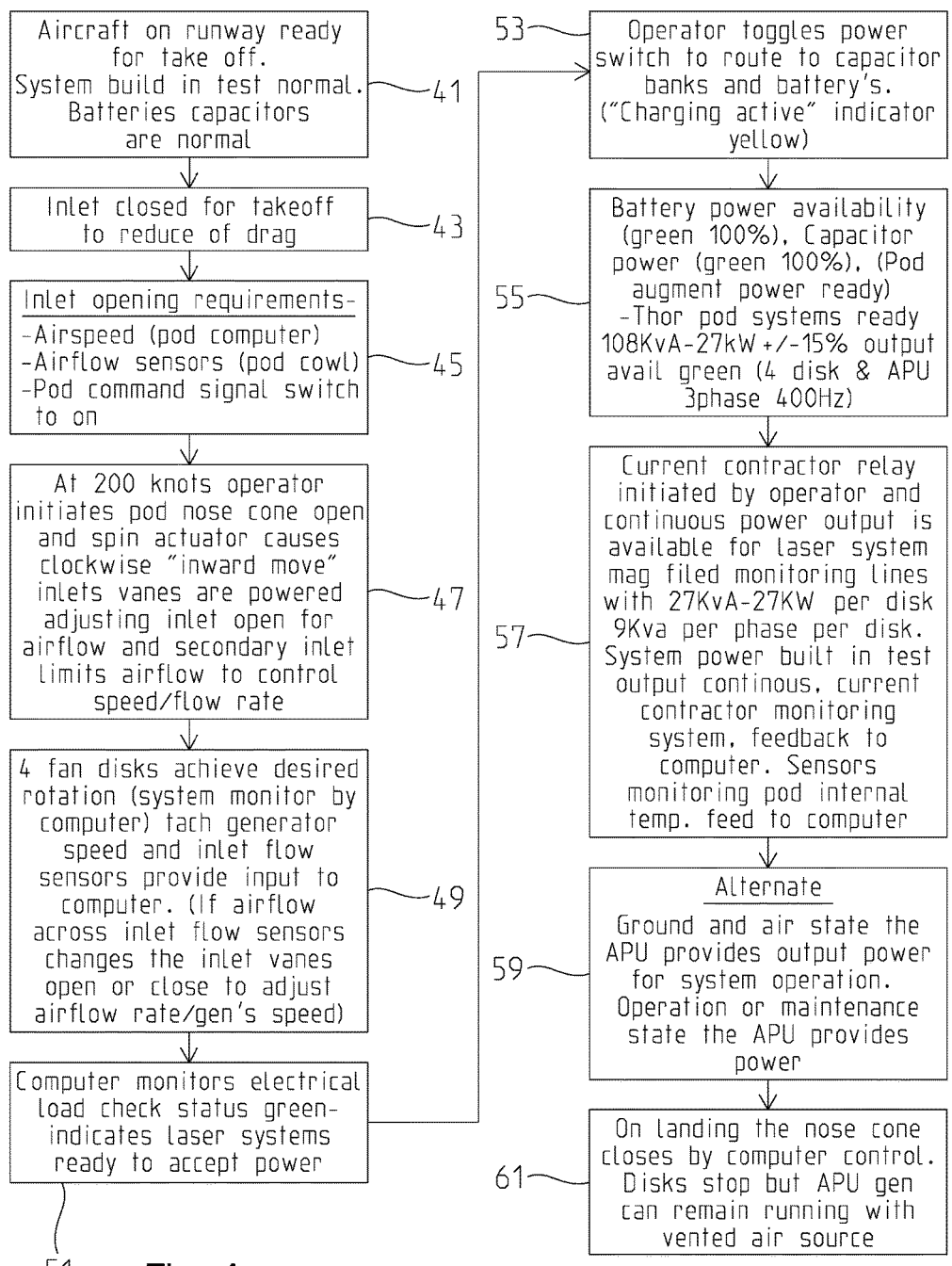
FIG. 4 shows an exemplary process of operating an exemplary mobile multi-mode power generation system with mode based adjustable drag configuration.

FIG. 4 shows an exemplary process of operating an exemplary mobile multi-mode power generation system with mode based adjustable drag configuration such as described herein. In this exemplary process, at step 41, an embodiment of the multi-mode power generation pod is attached to an aircraft then readied for takeoff. At step 43, an air inlet for the generation system can be closed to reduce drag during takeoff. At step 45, once in flight, inlet opening sensors determine will open upon certain pre-determined conditions. At step 47, at a predetermined speed, e.g., at 200 knots, an operator can initiate pod nose cone movement (e.g., air inlet formed by movement of the nose cone by the nose cone actuator 7) and causes clockwise inward movement with adjustable inlet opening for airflow. At step 49, when the air inlet is opened, a series of four fan disks separately coupled with four generators can commence achieving full rotation generator speed and inlet flow sensors provide input to computer. At step 51, a computer monitors electrical load and indicates when the system is ready to accept power. At step 53, the operator then toggles a power switch to route generated power to energy storage systems, e.g., capacitor banks and batteries. At step 55, battery power from the energy storage systems' availability is indicated by an internal user interface. At step 57, the operator then can initiate transfer of power output from the generators and/or battery power to supply a power consumption system such as a laser system. At step 59, an alternative embodiment may have a ground and air state that an APU provides output power. At step 61, upon landing, the nose cone can close by computer or operator control to cut off airflow to the disks and thereby cause the generators to stop generating power while the APU system remains operating or running based on intake airflow in through an alternative air path such as an additional intake vent positioned on a bottom of the multi-mode generation system.

Figure 5A:
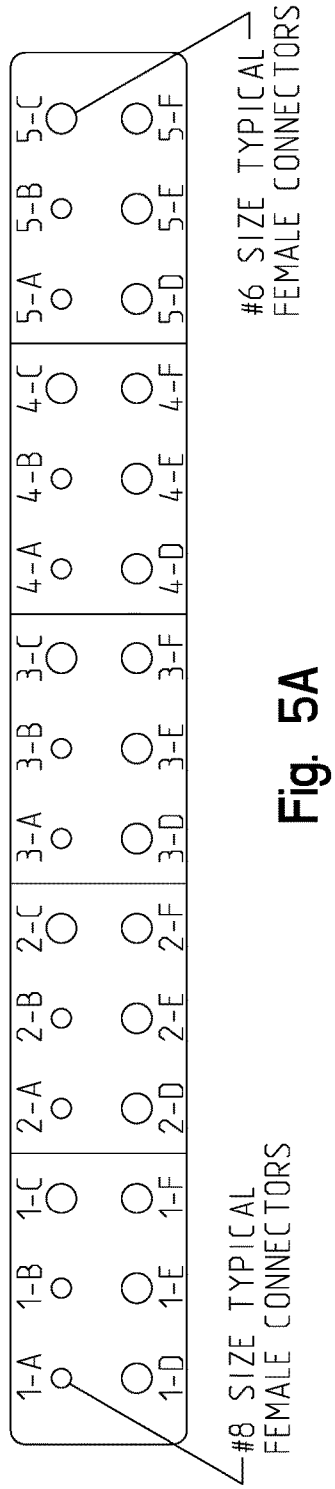
FIGS. 5A and 5B show an exemplary attachment structure between an exemplary external mounting structure and the exemplary mobile multi-mode power generation system utilizing an electrical coupling block.
Figure 5B:
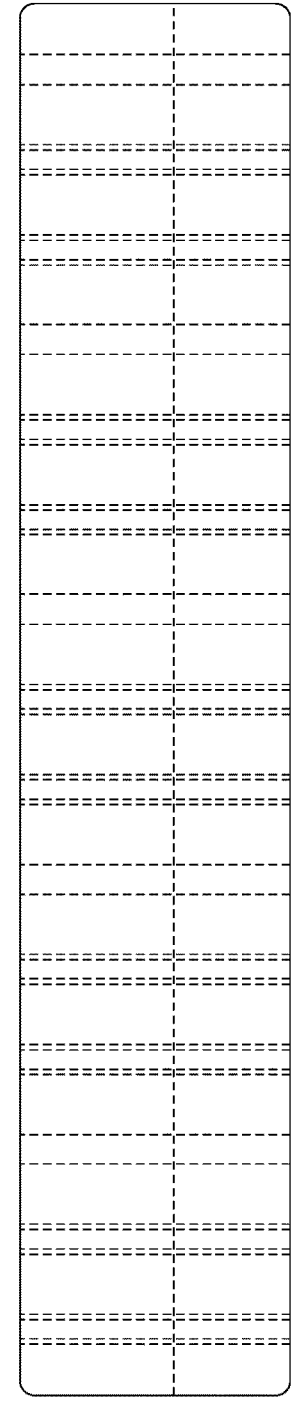

FIG. 5 shows an exemplary embodiment attachment structure between an external mounting structure 31 assembly and the multi-mode power generation structure 1. The attachment assembly embodied with male and female attachment sections creates an electrical coupling block that allows for electric control from power generation structure 1 to the cockpit user interface. In one embodiment, this electrical relay from power generation structure 1 could provide electrical energy for a laser system (not shown). Aircrafts generally do not have enough energy to support another system and thus would require a power generation structure 1 to support said laser system that is also attached to the same aircraft. Another embodiment would utilize the electrical coupling block to relay energy from one aircraft to another via an electric bus system. One embodiment would create a coupling between the power generation structure 1 when attaching to the BRU 32 ejector rack 31, and subsequently to the aircraft's wing (not shown). The side view 83 shows the electrical coupling block's dimensions that attach from the external mounting structure 3 land the multi-mode power generation structure 1.

One exemplary embodiment could require the use of super capacitors in the power storage section 14. If the power generation pod 1 is creating more energy than necessary to power whatever alternate embodiment is on the aircraft, super capacitors could be necessary to store generated energy until required. In at least some embodiments, energy would not be required at time of generation and thus storage of energy can be accomplished to facilitate on demand power to consumption systems such as, e.g., lasers. Power storage section 14 can be fitted with power storage systems such as lithium batteries or capacitors including power storage systems and/or cooling systems to avoid or prevent overheating based on charging or discharging using high voltage.

Figure 6:
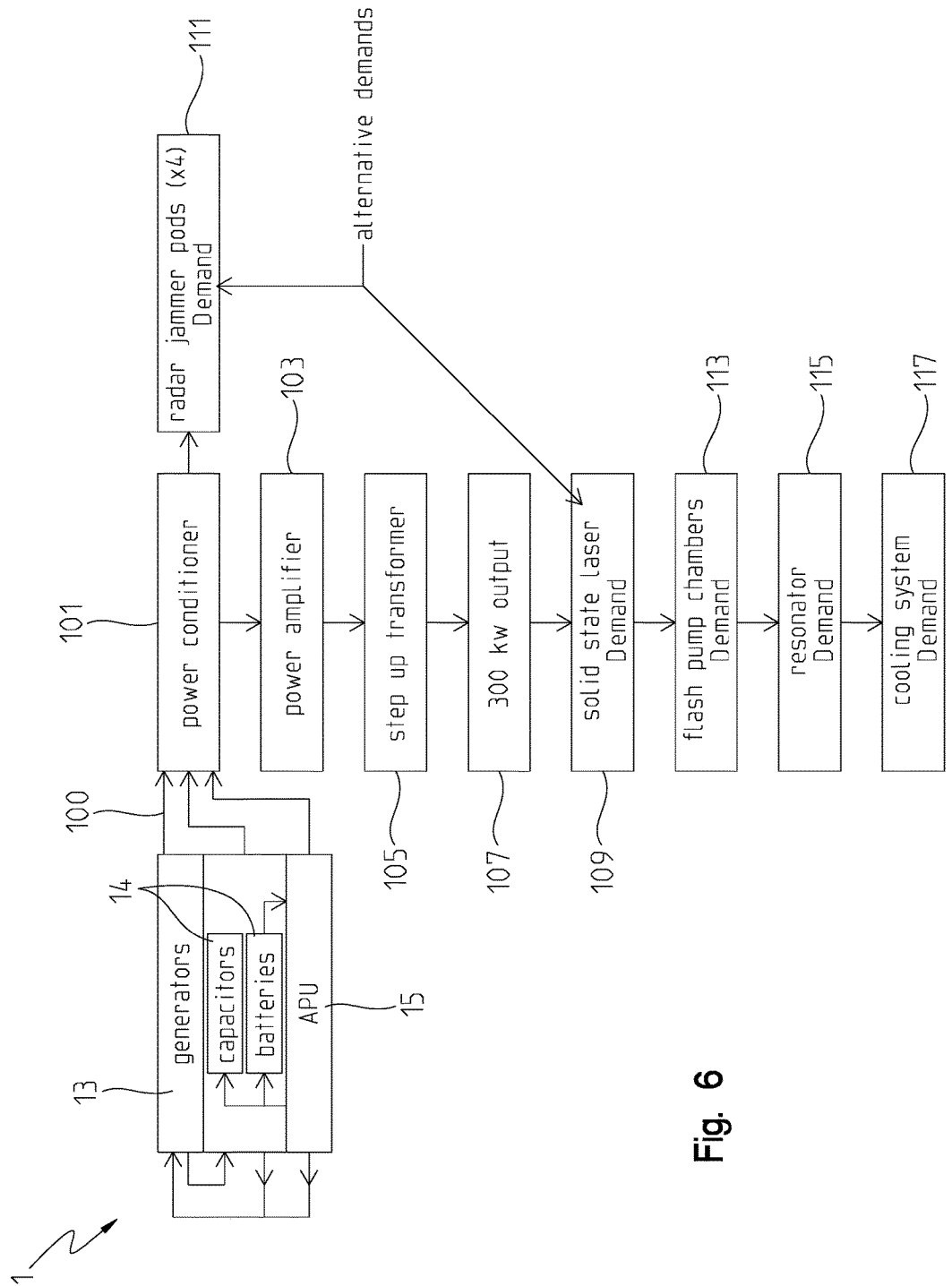
FIG. 6 shows an exemplary block diagram between the mobile multi-mode power generation system and various components that could utilize the generated power on the mobile aircraft.

FIG. 6 shows one exemplary embodiment of a block diagram to show the connection between the power generation structure 1 and the potential energy using components that will utilize the created power. Said power generation structure 1 is comprised of generators 13, energy storage section 14, and APU combustion section 15. The exemplary generators 13, energy storage section 14, and APU combustion section 15 are configured to create energy that is then relayed through power lines feeding systems 100 to the power conditioner 101. One exemplary embodiment could relay the energy from the power conditioner 101 to radar jammer pods 111 upon the radar jammer pods 111 energy demand. Another exemplary embodiment would utilize the power conditioner 101 relay to a power amplifier 103, then to step up transformer 105, followed by a 300 KW output 107 to a final solid state laser 109 upon power demand from various components such as the final solid state laser 109. After demand is met for, e.g., the solid state laser 109, energy can be relayed to flash pump chambers 113 until demand is met. Energy can then be relayed to resonator 115 until its demand is met. Finally the energy can be relayed to a cooling system 117 until its demand is met. These varying embodiments can be configured with selective alternative demand satisfaction or transfer systems (e.g., based on operator selection or automatic allocation based on specific device demands and programmed priorities) as well as the power conditioner 101 supplied by the generators 13, energy storage section 14, and APU combustion section 15.

Although the invention has been described in detail with reference to certain preferred embodiments, variations and modifications exist within the spirit and scope of the invention as described and defined in the following claims.

The invention claimed is:

1. A portable power system with multiple power generation modes and mode based adjustable drag configuration comprising:

an adjustable ram air inlet comprising a ram air guide structure configured to direct ram air to peripheral edges of the ram air guide structure, a cowling structure having an internal aperture with a diameter and shape that is formed to overlap with said peripheral edges of said ram air guide structure, an actuator coupled to the ram air guide structure and a first mounting structure adapted to move the ram air guide structure to open and close an inlet gap between said peripheral edges of said ram air guide structure and cowling structure at said internal aperture, and a plurality of adjustable or variable inlet vanes coupled to at least two sections of said cowling to modify airflow passing through said inlet gap;

a ram air powered section coupled with said first mounting structure of said adjustable ram air inlet comprising a plurality of ram air powered turbines comprising turbine blades oriented to rotate each turbine assembly based on passage of said ram air through said ram air powered section and configured to receive said ram air when said inlet gap is open;

one or more air pressure sensors configured to measure airflow at least at a portion of said adjustable ram air inlet;

a fuel powered section comprising a jet fuel powered auxiliary power unit configured for use when ram air pressure under a predetermined value is present or an electrical power surge demand requires augmented electrical power generation;

a generator section coupled with said ram air powered section and said fuel powered section;

a plurality of vortex generators disposed along an air path of said ram air within said portable power system, wherein said plurality of vortex generators are each positioned to alter said ram air and said air path to alter or increase pressure of said ram air on at least one of said turbine blades in said plurality of ram air powered turbines;

a power storage section comprising batteries or capacitors coupled to said generator section configured to store power generated by said generator section;

a control section configured to control said adjustable ram air inlet based on electrical demand signals input into said portable power system from an attached structure, said control section is further configured to selectively activate said fuel powered section to apply rotational power to said generator section, said control section is further configured to divert output from said generator section into said power storage section;

at least one transmission section configured to selectively decouple or couple said generator section from either said ram air powered section or said fuel powered section;

a power transfer section comprising a plurality of shafts which each shaft couples a different ram air powered turbine of the ram air powered section and different generators of the generator section, wherein one of said plurality of shafts is disposed at an outer circumference of said plurality of shafts, wherein each remaining said plurality of shafts is nested within another of said plurality of shafts a last remaining said plurality of shafts is nested within and at a center of said plurality of shafts wherein a center section of said adjustable ram air inlet, said ram air powered turbines, and said generators are disposed along a central generator axis of rotation; and wherein said portable power system selectively couples through an electromagnetic energy power transfer comprising a radiated beam and receiver system or a hardwire system to selectively releasable mounting system coupled to another structure comprising a mobile object configured to propel itself through a body of air.

2. An apparatus as in claim 1, wherein said adjustable ram air inlet comprises a conical shape coupled with a spring-loaded actuator controlled to reduce airflow passing into said ram air powered section.

3. An apparatus as in claim 1, wherein said generator section is selectively coupled with said power storage section.

4. An apparatus as in claim 1, wherein said generators and said ram air powered turbines couple through said plurality of shafts comprising:
   a first direct drive section that couples a first ram air powered turbine and a fourth generator;
   a second direct drive section that couples a second ram air powered turbine and a third generator;
   a third direct drive section that couples a third ram air powered turbine and a second generator; and
   a fourth direct drive section that couples a fourth ram air powered turbine and a first generator.

5. An apparatus as in claim 1, wherein said air pressure sensors are disposed forward of the ram air inlet to detect vectored airflow.

6. An apparatus as in claim 1, wherein said power storage section is designed to pump oil into a split shaft for lubrication.

7. A mobile structure including a portable power system with multiple power generation modes and mode based adjustable drag configuration comprising:
   a mobile structure with a propulsion system and an electrical system and an attachment interface section;
   an adjustable ram air inlet;
   a ram air powered section coupled with said adjustable ram air inlet comprising a plurality of ram air powered turbines;
   one or more air pressure sensors configured to measure airflow at least at said adjustable ram air inlet;
   a fuel powered section comprising a jet fuel powered auxiliary power unit configured for use when insufficient ram air is present or a power surge requires augmented power generation;
   a generator section coupled with said ram air powered section and said fuel powered section;
   a plurality of vortex generators disposed within an air path within said portable power system;
   a power storage section comprising batteries or capacitors;
   a control section comprising a section configured to control said adjustable ram air inlet based on electrical demand signals input into said portable power system from an attached structure, said control section is further configured to selectively activate said fuel powered section to apply rotational power to said generator section, said control section is further configured to divert output from said generator section into said power storage section;
   at least one transmission section configured to selectively decouple or couple said generator section from either said ram air powered section or said fuel powered section;
   a power transfer section comprising a plurality of nested shafts which each couple a different ram air powered turbine of the ram air powered section and different generators of the generator section;
   a detachable coupling point which selectively connects said portable power system to said attachment interface section of said mobile structure.

8. An apparatus as in claim 7, wherein said mobile structure is an aircraft.

9. An apparatus as in claim 7, wherein said mobile structure is a ground vehicle.

10. An apparatus as in claim 7, wherein said adjustable ram air inlet comprises a conical shape coupled with a spring-loaded actuator controlled to reduce airflow internally.

11. An apparatus as in claim 7, wherein said generator section is selectively coupled with said power storage section.

12. An apparatus as in claim 7, wherein said generators and said ram air powered turbines couple through said plurality of nested shafts comprising:
   a first direct drive coupling a first ram air powered turbine and a fourth generator;
   a second direct drive coupling a second ram air powered turbine and a third generator;
   a third direct drive coupling a third ram air powered turbine and a second generator; and a fourth direct drive coupling a fourth ram air powered turbine and a first generator.

13. An apparatus as in claim 7, wherein said air pressure sensors are disposed forward of the ram air inlet to detect vectored airflow.

14. An apparatus as in claim 7, wherein said power storage section is adapted to also pump oil into a split shaft for lubrication of said plurality of nested shafts.

15. A method for mobile multi-mode power generation comprising:
   providing a mobile structure including a portable power system with multiple power generation modes and mode based adjustable drag configuration comprising:
      a mobile structure with a propulsion system and an electrical system and an attachment interface section;
      an adjustable ram air inlet;
      a ram air powered section coupled with said adjustable ram air inlet comprising a plurality of ram air powered turbines with an adjustable ram air inlet;
   one or more air pressure sensors configured to measure airflow at least at said adjustable ram air inlet;
      a fuel powered section comprising a jet fuel powered auxiliary power unit configured for use when insufficient ram air is present or a power surge requires augmented power generation;
      a generator section coupled with said ram air powered section and said fuel powered section;
      a plurality of vortex generators disposed within an air path within said portable power system;
      a power storage section comprising batteries or capacitors;
      a control section comprising a section configured to control said adjustable ram air inlet based on electrical demand signals input into said portable power system from an attached structure, said control section is further configured to selectively activate said fuel powered section to apply rotational power to said generator section, said control section is further configured to divert output from said generator section into said power storage section; at least one transmission section configured to selectively decouple or couple said generator section from either said ram air powered section or said fuel powered section;
      a power transfer section comprising a plurality of nested shafts which each couple a different ram air powered turbine of the ram air powered section and different generators of the generator section;
      a detachable coupling point which selectively connects said portable power system to said mobile structure;
      adjusting said ram air inlet that provides reduced airflow to limit drag;

generating a power transfer through said plurality of ram air powered turbines with adjustable ram air inlets;

measuring airflow by said one or more air pressure sensors;

producing power through said generators selectively coupled with said ram air powered turbines;

storing said power generated by said generators in said power storage section comprising said batteries or capacitors;

generating force through said jet fuel powered auxiliary power unit configured for use when insufficient ram air is present or power surge requires augmented power generation;

controlling said adjustable ram air inlet based on electrical demand signals input into said portable power system, the control section is further configured to selectively activate said fuel powered section to apply rotational power to said generator section, said control section is further configured to divert output from said generator section into said power storage section;

controlling said generator section from selectively coupling or decoupling from said powered section or fuel powered section; and controlling the plurality of shafts from selectively coupling a different ram air powered turbine of the ram air powered section and different generators of the generator section.

16. A method as in claim 15, wherein said auxiliary power unit is used when said mobile structure is moving at a predetermined velocity to generate power from said generator section, wherein said predetermined velocity is selected based on a speed which said ram air powered section rotation is less than a value which generates electrical power below a predetermined value.

17. A method as in claim 15, wherein said adjustable ram air inlet comprises a conical shape coupled with a spring-loaded actuator controlled to reduce airflow internally.

* * * * *